United States Patent [19]
Young

[11] 3,863,679
[45] Feb. 4, 1975

[54] PIPELINE ASSEMBLY
[76] Inventor: Joseph Young, Red Mill Rd., R.D. 2, Peekskill, N.Y. 10566
[22] Filed: Feb. 5, 1973
[21] Appl. No.: 329,532

[52] U.S. Cl................ 138/106, 138/113, 248/54 R
[51] Int. Cl............................................ F16l 7/00
[58] Field of Search .......... 138/103, 106, 111, 112, 138/113, 114, 148; 248/54 R, 55

[56] References Cited
UNITED STATES PATENTS

| | | | |
|---|---|---|---|
| 1,240,521 | 9/1917 | Wendland | 248/54 |
| 1,585,266 | 5/1926 | Schlafly | 138/159 |
| 2,056,840 | 10/1936 | Collom | 138/113 |
| 2,181,002 | 11/1939 | Warner | 138/114 |
| 2,533,370 | 12/1950 | Havg | 248/55 |
| 2,621,005 | 12/1952 | Turpin | 248/54 |
| 2,914,090 | 11/1959 | Isenberg | 138/113 |
| 2,938,569 | 5/1960 | Goodrich | 138/148 |
| 3,712,330 | 1/1973 | Davis | 141/86 X |
| 3,721,270 | 3/1973 | Wittgenstein | 138/104 |

Primary Examiner—Herbert Goldstein
Attorney, Agent, or Firm—Brumbaugh, Graves, Donohue & Raymond

[57] ABSTRACT

A pipeline assembly comprises a pipe for conveying fluid material and a pipeline safety casing. The pipeline safety casing includes an elongated, tubular casing body and a channel located adjacent the periphery of the casing body. The channel extends longitudinally along the casing body and communicates with the interior of the casing body to collect fluid material from within the casing body and to conduct the fluid material to a collection point. Semi-circular carriers support the pipe concentrically in the casing body. The pipeline assembly has supporting towers longitudinalaly spaced apart along the casing body. Each supporting tower includes an upper and a lower tower portion, the upper portion being resiliently supported by springs interposed between it and the lower tower portion.

13 Claims, 5 Drawing Figures

PIPELINE ASSEMBLY

BACKGROUND OF THE INVENTION

Pipelines are a basic and widely used means of conveying fluids from one point to another. The fluids conveyed by a pipeline are often toxic or contaminating to the environment and may be subjected to extremes of heat and pressure while in the pipeline. Failure of the pipeline with the resulting escape of fluids can cause serious property and ecological damage and may result in personal injury and death. Moreover, some conventional methods of cleaning up fluids that escape from a pipeline, such as burning off spilled oil, can be as hazardous in some situations as the escaping fluid itself. Pipeline breaks also represent serious business losses to the pipeline owner and may cause commercial production delays and even disruptions in critical national defenses.

Various approaches have been used to protect the fluid conveying pipe of a pipeline. One currently popular approach is simply to specify the best possible pipe, fabricated of high strength materials and coated to provide insulation. Such an approach, however, makes no effort to contain fluid escaping from a broken pipe and once a break occurs in the pipe, fluid will continue to spill into the area around the pipe until the break is detected and reported and the flow of fluid in the pipe is shut off.

Another approach to protecting a fluid conveying pipe is to enclose the pipe in a casing, which can resist or absorb external stresses and insulate the pipe from ambient temperature variations. Such a casing may also help to contain fluid escaping from the pipe. Generally, however, a casing is not intended to perform a containing function. It may not be sealed adequately or it may be substantially filled with insulating material. There may be no means of detecting fluid in the casing or of draining the casing, so that escaping fluid contained by the casing simply builds up until it ruptures the casing or finds an existing escape point in the casing.

A further problem in utilizing a pipeline casing as a means of protecting a fluid conveying pipe is that the casing must be adequately supported to avoid structural failure. Adequate support may be difficult to achieve in areas subject to seismic earth movements or unstable soil conditions. For example, in arctic areas where unstable soil conditions may result from melting of the permafrost, the relatively warm pipeline must be insulated from the permafrost. Insulation can be provided by pads of gravel several feet thick, but gravel for such pads is expensive to provide and the pads significantly increase the total load on the soil beneath the pipeline, making bearing soil failure more likely. In addition, the pads and the pipeline present a significant barrier to migration of native wildlife, as well as to natural water drainage patterns, and may thus upset the local environmental balance.

SUMMARY OF THE INVENTION

The present invention relates to an improved pipeline assembly which comprises a pipe for conveying fluid material and a pipeline safety casing. The pipeline safety casing includes an elongated, tubular casing body and a channel located adjacent the periphery of the casing body. The channel extends along the length of the casing body, thereby increasing the resistance of the casing body to deflection, and communicates with the interior of the casing body to collect fluid material, which may have escaped from the pipe, from within the casing body and to conduct the fluid material to a collection point. The casing body is constructed of semicircular casing sections, each of which has a channel that extends longitudinally along the casing section and is located centrally relative to an outer periphery of the casing section. Each casing section has a flange arranged along the peripheral edge of the casing section and formed to engage the flanges of adjacent casing sections to joint the casing sections together. A seal member is received between the flanges of adjacent casing sections.

The fluid-conveying pipe is supported concentrically in the casing body by carriers that have generally semicircular seat parts formed to fit the interior circumference of the casing body and cradle parts with arcuate portions formed to fit the exterior circumference of the pipe. To restrain movement of the carriers longitudinally along the casing body, it is corrugated and the carrier seat parts conform to the corrugations of the casing body. The carriers are, however, free to rotate around the interior circumference of the casing body to permit movement of the pipe relative to the casing body.

The pipeline assembly has supporting towers longitudinally spaced apart along the casing body. Each supporting tower includes a lower tower portion that rests on a supporting surface and an upper tower portion that is secured to the casing body. Each tower portion has at least two legs and the legs of each upper tower portion slidably receive the legs of the corresponding lower tower portion. Springs interposed between the tower portions and slidably received in the legs of the upper tower portion resiliently support the upper tower portion to mitigate the effects of seismic disturbances and bearing soil failures. The upper tower portions are secured to the casing body by bearing members which permit pivotal and longitudinal movement of the casing body relative to the supporting towers.

The pipeline assembly further includes sump chambers that communicate with the channel of the pipeline safety casing to receive fluid material from the channel. A pump in each sump chamber pumps fluid material received in the sump chamber back into the pipe to reduce material loss. The sump chambers also include devices for detecting and monitoring a flow of fluid material from the channel into the sump chambers. The devices may be used in conjunction with shut-off valves to control the flow of fluid material to a portion of the pipe from which fluid material is escaping.

As can be seen from the above description, the pipeline safety casing of the present invention protects a fluid-conveying pipe and also collects fluid material escaping from the pipe and conducts the escaping fluid material to a collection point. The invention presents a positive means of preventing fluid material loss and environmental damage from fluid material escaping from a pipeline. In addition, the supporting towers of the invention absorb and mitigate the effects of a seismic disturbance or bearing soil failure. The supporting towers insulate the pipe from permafrost in arctic areas without significantly increasing the total load on the soil beneath the pipeline or raising a barrier to wildlife migration or water drainage.

BRIEF DESCRIPTION OF THE DRAWINGS.

For a better understanding of the invention, reference may be made to the following description of an exemplary embodiment, taken in conjunction with the figures of the accompanying drawings, in which.

DESCRIPTION OF AN EMBODIMENT

Figure 1:
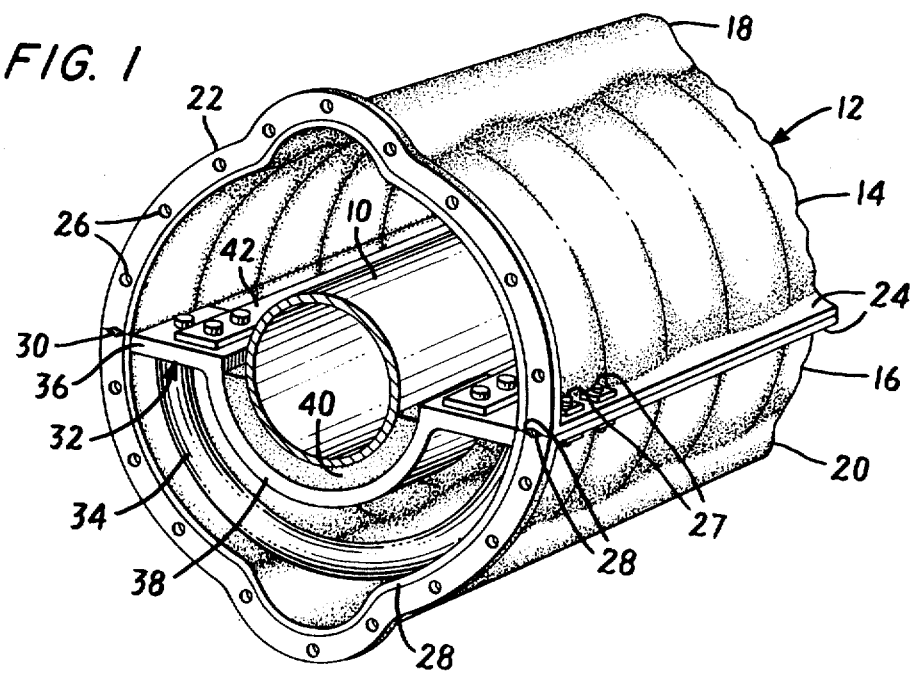
FIG. 1 is a perspective view of a pipeline assembly according to the invention.

In an exemplary embodiment of the invention, as shown in FIGS. 1–4, a pipeline assembly comprises a pipe 10 for conveying fluid material, such as crude oil, and a pipeline safety casing, generally designated 12. The pipeline safety casing includes upper and lower semicircular casing sections 14 and 16 formed with channels 18 and 20 that extend longitudinally along the casing sections 14 and 16 and are located centrally relative to the outer arcuate peripheries of the casing sections. The casing sections 14 and 16 may be constructed of any strong, durable material, such as corrugated and galvanized steel. The use of semicircular casing sections permits, for example, the upper section 14 to be removed easily for repairs to the pipe or either casing section to be removed for replacement of damaged sections. It is within the scope of the invention for the casing sections 14 and 16 to be of any other shape, such as oval or parabolic, in transverse section.

The channels 18 and 20 are open to the interior of the tubular body portion of the pipeline safety casing 12 but are radially outwardly displaced from its circular periphery. As shown, the channels 18 and 20 are integrally formed with the casing sections 14 and 16 but it is within the scope of the invention to have the channels 18 and 20 fabricated separately and then attached to the tubular body portions of the casing sections 14 and 16. Similarly, the channels 18 and 20 need not be completely open to the interior of the tubular body portion of the pipeline safety casing 12 but may communicate with the interior through regularly spaced perforations, for example. The channels 18 and 20 collect fluid material from within the tubular body portion of the pipeline safety casing 12, such as fluid material leaking from the pipe 10, and also help to stiffen the casing 12 against vertical deflection. As shown, the channel 20 is arranged to lie at the lowermost point of any cross-section taken transversely through the pipeline safety casing 12. This location is preferred for collecting heavier-than-air fluids but the channels 18 and 20 may be in any position adjacent the periphery of the tubular body portion of the pipeline safety casing 12. For example, the channel 18, which lies at the uppermost point on the pipeline safety casing 12, is in a position for collecting lighter-than-air fluids.

The casing sections 14 and 16 have upstanding flanges 22 and 24 arranged along their peripheral edges. The flanges 22 and 24 are formed to engage each other along the length of casing sections 14 and 16 and to engage the flanges of other adjacent casing sections at the ends of casing sections 14 and 16. Both flanges 22 and 24 have bolt holes 26 for bolting the casing sections together with bolts 27. A V-shaped groove 28 midway across the width of each of the flanges 22 and 24 receives a gasket 30 to seal the joints between adjacent casing sections.

Figure 4:
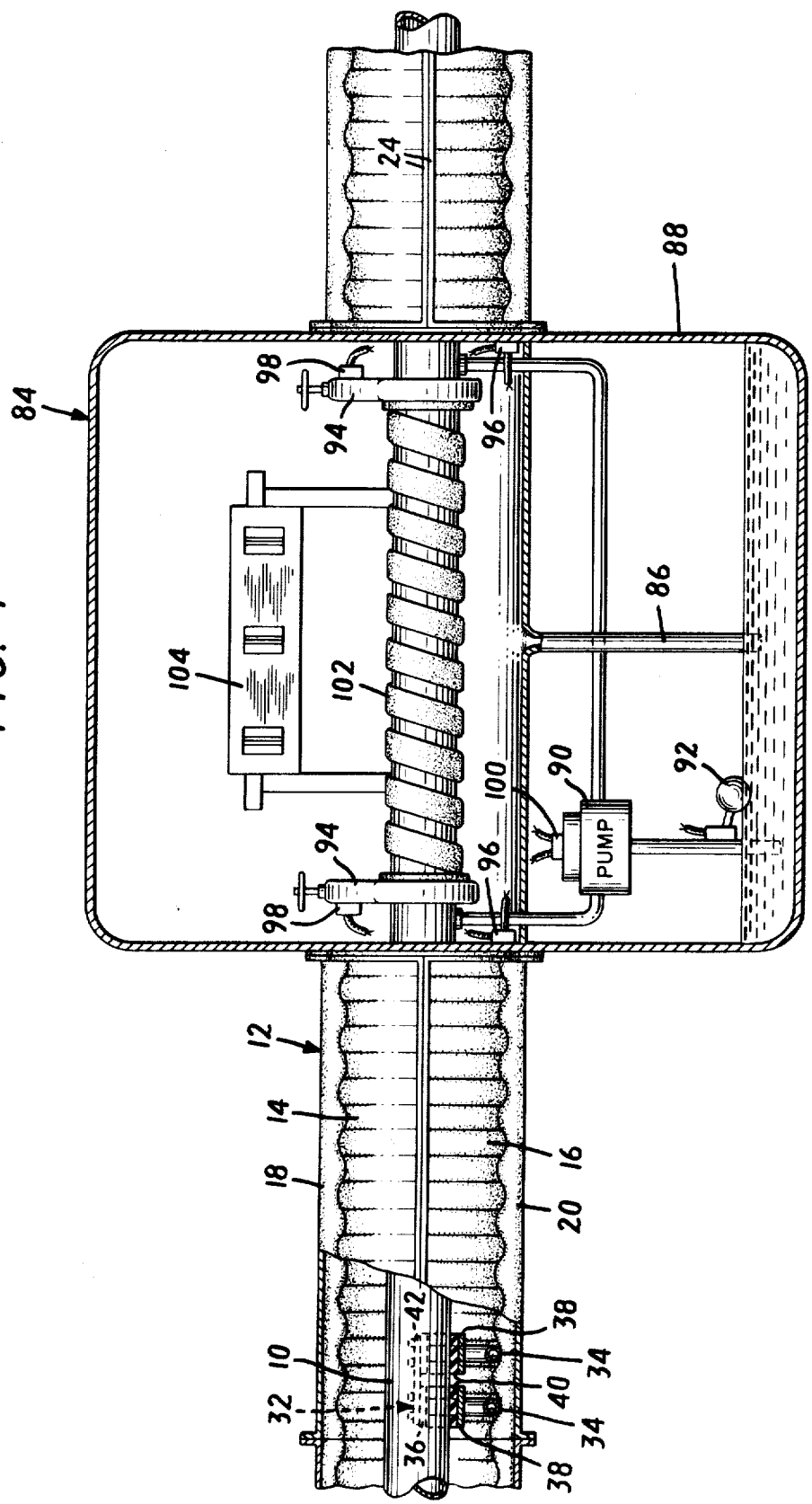
FIG. 4 is a sectional view of a sump chamber utilized in the pipeline assembly.

The pipe 10 is supported concentrically in the pipeline safety casing 12 by pipe carriers 32 spaced at intervals along the pipeline safety casing. Each carrier 32 includes a generally semicircular seat 34 that fits the interior circumference of the casing sections 14 and 16 and passes over the channel 20 of the lower casing section 16 without blocking the channel 20. The carrier 32 further includes a cradle 36 that is bolted across the ends of the seat 34 and has an arcuate portion 38 which fits the exterior circumference of the pipe 10. To prevent the temperature of the fluid in the pipe 10 from affecting the temperature of the casing sections 14 and 16 or vice versa by conduction through the carrier 32, a pad of insulating material 40 is secured to the arcuate portion 38 of the carrier cradle 36. Longitudinal movement of the carrier 32 along the pipeline safety casing 12 is restrained by the interaction between the corrugations of the casing sections 14 and 16 and the seat 34 of the carrier 32, which leaves the carrier 32 free to rotate about the interior of the pipeline safety casing 12. The carriers 32 may be employed in pairs, as shown in FIG. 4 for increased stability relative to pivoting, particularly where non-corrugated casing sections are utilized. Connecting members 42 join the cradles 36 of adjacent carriers 32 to provide additional stability for the carriers and also to restrain longitudinal movement of the carriers 32 if non-corrugated casing sections are utilized.

Figure 2A:
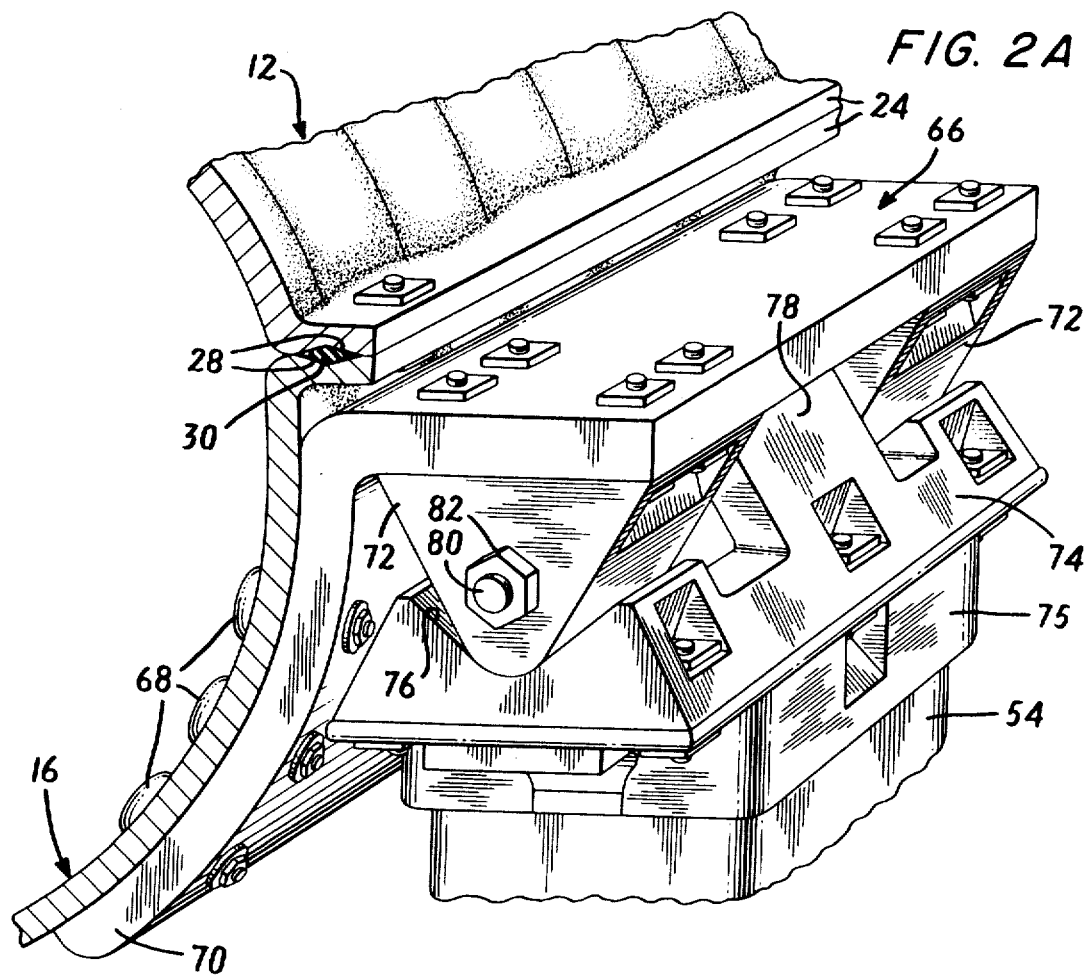
FIG. 2A is an enlarged perspective view of a bearing shown in FIG. 2.
Figure 2:
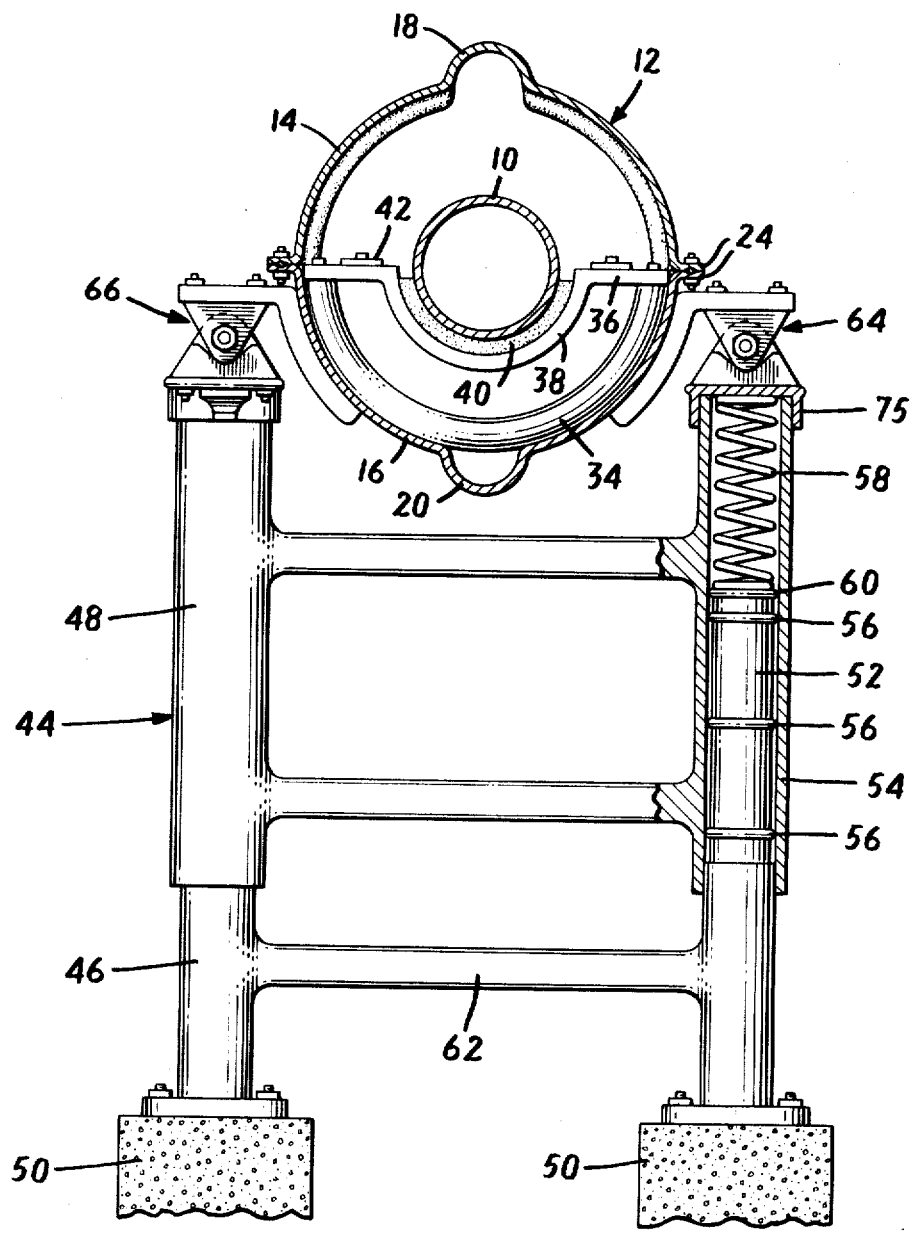
FIG. 2 is a sectional end view of the pipeline assembly, including a supporting tower.
Figure 3:
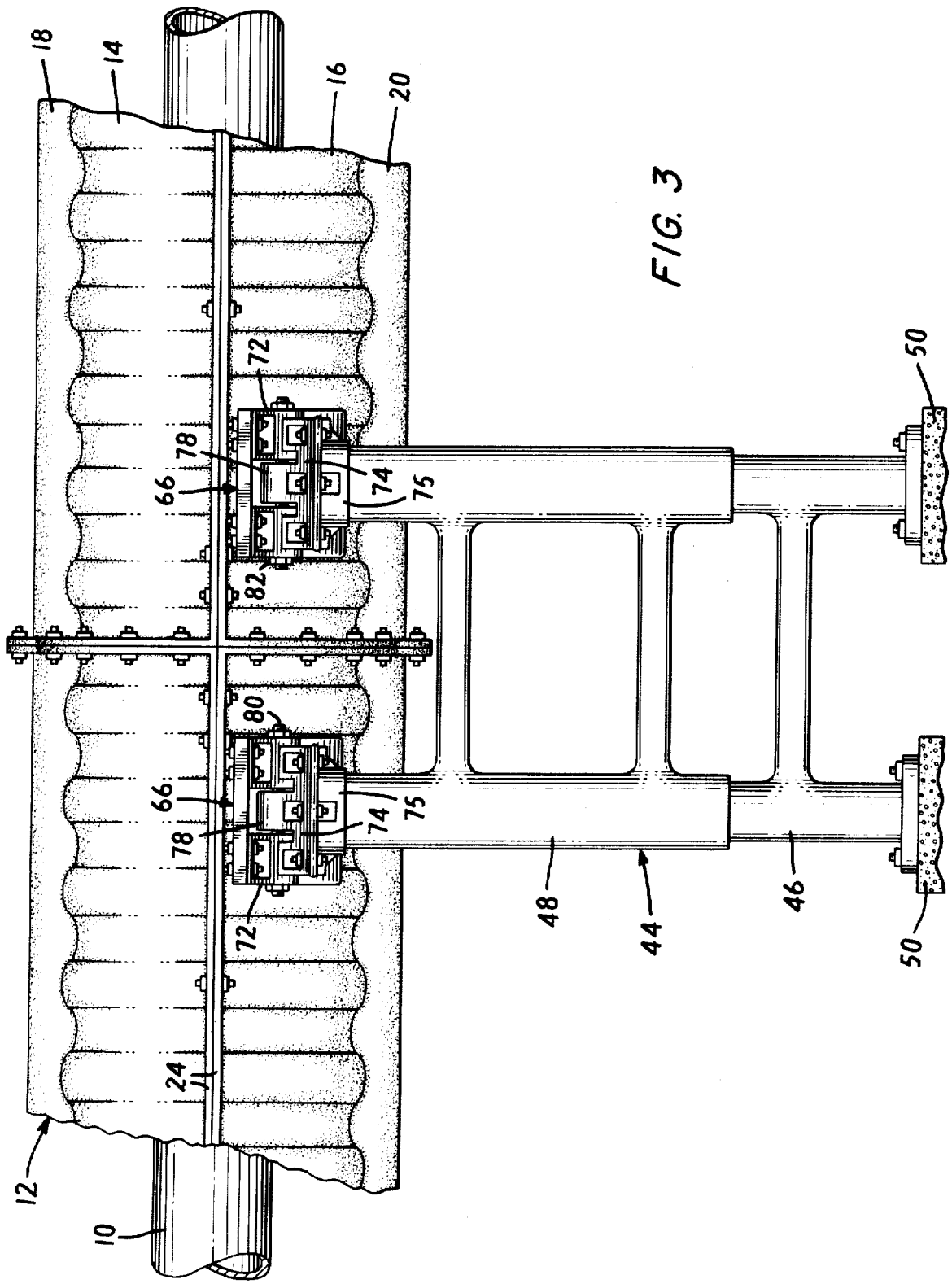
FIG. 3 is a side view of the pipeline assembly of FIG. 2.

The pipe 10 and the pipeline safety casing 12 are supported by supporting towers 44 spaced at intervals along the length of the pipeline safety casing 12. As shown in FIGS. 2 and 3, each supporting tower 44 includes a lower tower portion 46, which rests on a supporting surface (not shown), and an upper tower portion 48, which is secured to the lower section 16 of the pipeline safety casing 12. In the illustrated embodiment, the lower tower portion 46 is bolted to a concrete footing 50 that rests on the supporting surface. It is within the scope of the invention, however, to have the lower tower portion 46 rest directly on the supporting surface or on piles or other convenient supports. The four legs 52 of the lower tower portion 46 are slidably received in the four hollow legs 54 of the upper tower portion 48. Guide rings 56 properly align the legs 52 of the lower tower portions 46 within the legs 54 of the upper tower portion 48 and coil springs 58 resiliently support the upper tower portion 48 on the upper ends 60 of the legs 52 of the lower tower portion 46. Pneumatic or hydraulic spring devices may be used in place of or to supplement the coil springs 58. To safeguard against simultaneous failure of all of the springs 58, cross members 62 extend between adjacent legs 52 of the lower tower portion 46 to halt downward movement of the upper tower portion 48.

The upper tower portion 48 is secured to the pipeline safety casing 12 by bearings 64. As shown in FIG. 2A, each bearing 64 includes a bifurcated rocker 66, which is bolted to the lower casing section 16 by bolts 68 that pass through the wall of the casing section 16 and through an arcuate flange 70 of the rocker 66. The bifurcations 72 of the rocker 66 rest on an anvil 74, which is bolted to a cap 75 for a leg 54 of the upper tower portion 48. Two curved seating surfaces 76 on the anvil 74 receive the bifurcations 72 to permit rocking movement of the bifurcations 72 and relative pivotal movement between the pipeline safety casing 12 and the supporting tower 44. The seating surfaces 76 are separated by an understanding lug 78, which is dimensioned so as to be spaced from each bifurcation 72 to permit limited longitudinal movement of the pipeline safety casing 12 relative to the supporting tower 44. An axle 80 passes through both bifurcations 72 and the lug 78 to secure the rocker 66 to the anvil 74. Nuts 82 screwed on to the ends of the axle 80 hold the axle 80 in place.

Fluid material that escapes from the pipe 10 is collected in the channel 20 of the lower casing section 16 and is conducted to sump chambers 84 provided at intervals along the length of the pipeline safety casing 12. As shown in FIG. 4, a sump chamber 84 has a drain pipe 86 for conducting fluid material from the casing channel 20 into a holding tank 88 in the sump chamber 84. A two-way sump pump 90, activated by a float switch 92, pumps fluid material received in the holding tank 88 back into the pipe 10 and thereby functions as a control system for escaping fluid material.

Since the pump 90 can be set to pump the fluid material from the holding tank 88 into the pipe 10 at either of two locations, it may be advantageously used in conjunction with shut-off valves 94 on either side of the sump chamber 84. When fluid material is detected escaping from a portion of the pipe 10, the shut-off valves 94 in adjacent sump chambers 84 are turned off to isolate the portion of pipe 10 between the sump chambers 84. As the escaping fluid material runs back along the channel 20 into the sump chambers 84, the sump pumps 90 are set to pump the fluid material into non-isolated portions of the pipe 10. The operation may be conducted manually or activated automatically by monitoring devices 96, for example, conventional trip mechanisms or thermocouple devices, located on either side of the sump chamber 84 at the point where the casing channel 20 communicates with the sump chamber 84. When either of the monitoring devices 96 detects a fluid flow in the channel 20, it sends a signal to electrical switches 97 which close the corresponding valve 94. A second signal is sent to another electrical switch 100 connected to the sump pump 90 causing pump 90 to pump fluid material in the holding tank 88 to the non-isolated portion of the pipe 10. The monitoring device may also be electrically connected to the shut-off valves 94 in adjacent sump chambers 84 to insure complete isolation of the leaking portion of pipe. Similarly, the monitoring devices 96 might be connected in an electrical circuit with a display board (not shown) at a manned pumping or repair station. The upper channel 18 would provide a convenient place in which to run the connecting wires in either of the above situations. It is also apparent that the channel 20, by collecting and concentrating fluid material leaking from the pipe 10, will enhance the useful range of the monitoring devices 96.

The above-described sump chambers 84 are particularly useful in situations where there is a fluid material leak of such low velocity that it would not be reflected in a detectable pressure drop at the nearest pumping station. In a conventional pipeline, a low velocity leak could continue undetected for considerable periods, resulting in considerable fluid material loss and ecological damage. With the present inventive pipeline assembly, the sump chambers 84 can be arranged to pump escaping fluid material back into the pipe 10, while the monitoring devices 96 merely send a signal to a display board indicating that a leak has occurred and repairs are necessary.

If it is necessary to heat the fluid material in the pipe 10, the sump chamber 84 may include a heating element 102 encircling the pipe 10 and a heating element control panel 104. The heating element may be necessary to insure the proper flow of oil in the pipe 10 in an arctic area, for example. If the fluid material is heated, then fluid material escaping from the pipe 10 may also be conveniently monitored by heat sensors (not shown) mounted in the upper channel 18 of the pipeline safety casing 12. Heated fluid material escaping from the pipe 10 will heat the ambient air in the pipeline safety casing 12 and the heated air will naturally rise into the upper channel 18, activating the nearest heat sensor which will relay a signal to a manned display board (not shown).

It will be understood that the above described embodiment is merely exemplary and that those skilled in the art may make many variations and modifications without departing from the spirit and scope of the invention. All such modifications and variations are intended to be included within the scope of the invention as defined in the appended claims.

I claim:

1. A pipeline assembly comprising:
   a. a pipe for conveying fluid material;
   b. a pipeline safety casing for receiving the pipe including:
      i. an elongated, tubular, corrugated casing body, and
      ii. A channel located adjacent the periphery of the casing body, the channel of the safety casing extending longitudinally along the casing body and communicating with the interior of the casing body to collect fluid material from within the casing body and to conduct the fluid material to a collection point; and
   c. carriers for supporting the pipe generally concentrically in the casing body, each carrier including:
      i. a generally semicircular seat part formed to fit closely an interior circumference of the casing body, and
      ii. A cradle part having an arcuate portion formed to fit closely an exterior circumference of the pipe, the seat parts of the carriers conforming to the corrugations of the casing body so as to restrain movement of the carriers longitudinally along the casing body.

2. A pipeline assembly according to claim 1, wherein the carriers are adapted to rotate around the interior circumference of the casing body.

3. A pipeline assembly according to claim 1, wherein the casing body is constructed of semicircular casing sections, each casing section having a channel that extends longitudinally along the casing section and is located centrally relative to an outer arcuate periphery of the casing section.

4. A pipeline assembly according to claim 3, wherein each casing section has a flange arranged along a peripheral edge of the casing section, the flange being formed to engage flanges of adjacent casing sections to join the casing sections together, and further being adapted to receive a seal member.

5. A pipeline assembly according to claim 1, further comprising supporting towers longitudinally spaced apart along the casing body, each supporting tower including a lower tower portion adapted to rest on a supporting surface, an upper tower portion adapted to be secured to the casing body, and spring means interposed between the upper and lower tower portions for resiliently supporting the upper tower portion.

6. A pipeline assembly according to claim 5, wherein each of the upper and lower tower portions has at least two legs and legs of one of the upper and lower tower portions of each supporting tower slidably receive legs of the other of the upper and lower tower portions of the supporting tower.

7. A pipeline assembly according to claim 6, wherein the spring means includes springs slidably received within legs of said one of the upper and lower tower portions of each supporting tower.

8. A pipeline assembly according to claim 5, wherein bearing members secure the casing body to the upper tower portion of each supporting tower for pivotal and longitudinal movement of the casing body relative to the supporting tower.

9. A pipeline assembly according to claim 8, wherein each bearing member includes a bifurcated first member fastened to the casing body, a second member fastened to an upper tower portion of a supporting tower, and an axle coupling the first member to the second member, the second member having spaced-apart seating surfaces to receive and support the bifurcations of the first member for pivotal movement about the axle and a lug located between the seating surfaces, the lug projecting between the bifurcations of the first member and being spaced from each bifurcation for limited relative movement of the bifurcations and the lug, the axle passing through the bifurcations of the first member and the lug of the second member.

10. A pipeline assembly according to claim 1, wherein the collection point includes a sump chamber that communicates with the channel to receive the fluid material from the channel and to return the fluid material to the pipe.

11. A pipeline assembly according to claim 10, wherein the sump chamber includes means for detecting and monitoring a flow of fluid material from the channel into the sump chamber.

12. A pipeline assembly according to claim 11, wherein the sump chamber further includes means responsive to the detecting and monitoring means for controlling a flow of fluid material in the pipe.

13. A pipeline assembly comprising:
 a. a pipe for conveying fluid material;
 b. a pipeline safety casing for receiving the pipe including:
  i. an elongated casing body, and
  ii. a channel located adjacent the periphery of the casing body, the channel extending longitudinally along the casing body and communicating with the interior of the casing body to collect fluid material from within the casing body and to conduct the fluid material to a collection point;
 c. supporting towers longitudinally spaced apart along the casing body, each supporting tower including:
  i. a lower tower portion adapted to rest on a supporting surface,
  ii. an upper tower portion adapted to be secured to the casing body, and
  iii. spring means interposed between the upper and lower tower portions for resiliently supporting the upper tower portion; and
 d. bearing members securing the casing body to the upper tower portion of each supporting tower for pivotal and longitudinal movement of the casing body relative to the supporting tower, each bearing member including:
  i. a bifurcated first member fastened to the casing body,
  ii. a second member fastened to an upper tower portion of a supporting tower, and
  iii. an axle coupling the first member to the second member,
the second member having spaced-apart seating surfaces to receive and support the bifurcations of the first member for seating surfaces, the lug projecting between the bifurcations of the first member and being spaced from each bifurcation for limited relative movement of the bifurcations and the lug, the axle passing through the bifurcations of the first member and the lug of the second member.

* * * * *